(12) United States Patent
Lasko et al.

(10) Patent No.: US 11,789,874 B2
(45) Date of Patent: Oct. 17, 2023

(54) METHOD, APPARATUS, AND SYSTEM FOR STORING MEMORY ENCRYPTION REALM KEY IDS

(71) Applicant: QUALCOMM Incorporated, San Diego, CA (US)

(72) Inventors: Darren Lasko, Forest, VA (US); Roberto Avanzi, Munich (DE); Thomas Philip Speier, Wake Forest, NC (US); Harb Abdulhamid, Raleigh, NC (US); Vikramjit Sethi, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1013 days.

(21) Appl. No.: 16/547,527

(22) Filed: Aug. 21, 2019

(65) Prior Publication Data

US 2019/0384725 A1     Dec. 19, 2019

Related U.S. Application Data

(63) Continuation-in-part of application No. 15/865,994, filed on Jan. 9, 2018, now abandoned.
(Continued)

(51) Int. Cl.
*G06F 12/14* (2006.01)
*H04L 9/14* (2006.01)
(Continued)

(52) U.S. Cl.
CPC .......... *G06F 12/1408* (2013.01); *G06F 21/72* (2013.01); *H04L 9/0643* (2013.01); *H04L 9/14* (2013.01); *G06F 2212/402* (2013.01)

(58) Field of Classification Search
None
See application file for complete search history.

(56) References Cited

U.S. PATENT DOCUMENTS

| 2003/0033537 A1* | 2/2003 | Fujimoto | ................ G06F 21/72 713/193 |
| 2008/0229117 A1 | 9/2008 | Shin et al. | |

(Continued)

FOREIGN PATENT DOCUMENTS

| CN | 109033353 A | * 12/2018 | ............. G06F 17/30 |
| TW | 201415286 A | 4/2014 | |
| WO | 2016072999 A1 | 5/2016 | |

OTHER PUBLICATIONS

Dapeng L., et al., "An Empirical Study on the Performance of Hash Table," 13th International Conference on Computer and Information Science (ICIS), Jun. 4, 2014, pp. 477-484, XP032652354, DOI: 10.1109/ICIS.2014.6912180 [retrieved on Sep. 26, 2014] pp. 1-2.
(Continued)

*Primary Examiner* — Sanchit K Sarker
(74) *Attorney, Agent, or Firm* — W&T/Qualcomm

(57) ABSTRACT

A method, apparatus, and system for storing memory encryption realm key IDs is disclosed. A method comprises accessing a memory ownership table with a physical address to determine a realm ID associated with the physical address, accessing a key ID association structure with the realm ID to determine a realm key IS associated with the realm ID, and initiating a memory transaction based on the realm key ID. Once retrieved, the realm key ID may be stored in a translation lookaside buffer.

10 Claims, 11 Drawing Sheets

Related U.S. Application Data

(60) Provisional application No. 62/721,324, filed on Aug. 22, 2018.

(51) Int. Cl.
　　*G06F 21/72*　　(2013.01)
　　*H04L 9/06*　　(2006.01)

(56) References Cited

U.S. PATENT DOCUMENTS

| | | |
|---|---|---|
| 2011/0293007 A1 | 12/2011 | Maino et al. |
| 2012/0078970 A1 | 3/2012 | Matsakis |
| 2012/0084574 A1 | 4/2012 | Nakanishi et al. |
| 2014/0280024 A1* | 9/2014 | Baskett ............... G06F 16/2456 707/714 |
| 2015/0039853 A1* | 2/2015 | Sen ................... G06F 16/24544 712/4 |
| 2016/0241676 A1* | 8/2016 | Armstrong ........ G06F 16/24568 |
| 2016/0292085 A1 | 10/2016 | Axnix et al. |
| 2016/0292442 A1 | 10/2016 | Axnix et al. |
| 2016/0314171 A1 | 10/2016 | Lurie et al. |
| 2016/0323377 A1 | 11/2016 | Einkauf et al. |
| 2017/0085377 A1* | 3/2017 | Pogmore ............... H04L 9/0869 |
| 2017/0132156 A1 | 5/2017 | Axnix et al. |
| 2017/0244557 A1 | 8/2017 | Riel et al. |
| 2017/0277898 A1 | 9/2017 | Powell et al. |
| 2018/0034792 A1* | 2/2018 | Gupta ................... G06F 21/602 |
| 2018/0063103 A1 | 3/2018 | Jahid et al. |
| 2018/0107608 A1 | 4/2018 | Kaplan et al. |
| 2018/0173645 A1 | 6/2018 | Parker et al. |
| 2019/0050602 A1 | 2/2019 | Sela et al. |
| 2019/0095350 A1 | 3/2019 | Durham et al. |
| 2019/0215160 A1 | 7/2019 | Lasko et al. |

OTHER PUBLICATIONS

International Search Report and Written Opinion for International Patent Application No. PCT/US2019/047694, dated Nov. 15, 2019, 17 pages.
International Search Report and Written Opinion—PCT/US2019/012555—ISA/EPO—dated Feb. 27, 2019.
Search Report for Tawain Patent Application No. 108100549, dated Dec. 15, 2022, 1 page.

* cited by examiner

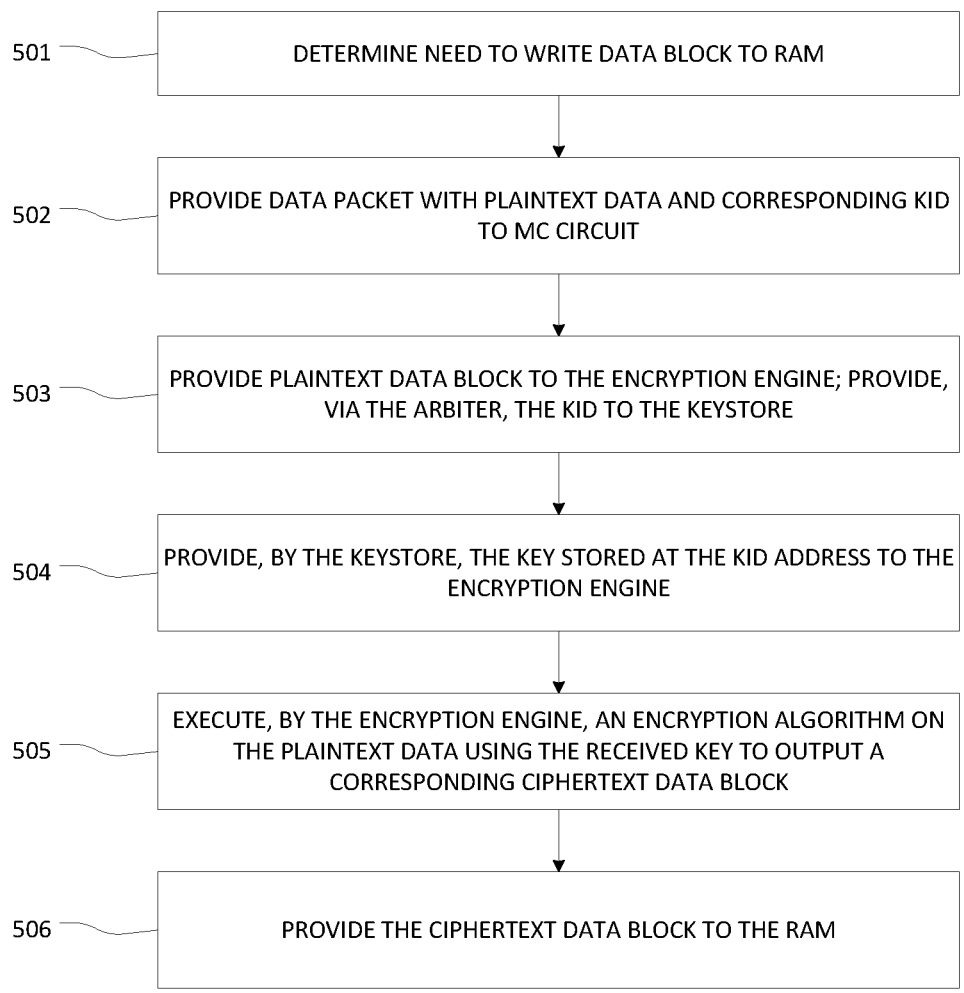

METHOD, APPARATUS, AND SYSTEM FOR STORING MEMORY ENCRYPTION REALM KEY IDS

CROSS REFERENCE TO RELATED APPLICATIONS

This application is a continuation-in-part of U.S. application Ser. No. 15/865,994, filed 9 Jan. 2018—the entire contents of which are herein incorporated by reference for all purposes; and claims the benefit of U.S. Provisional Application No. 62/721,324, filed 22 Aug. 2018—the entire contents of which are herein incorporated by reference for all purposes.

FIELD

Aspects of the present disclosure relate generally to memory encryption, and more specifically to management of keys for memory encryption in systems utilizing virtualized computing devices.

BACKGROUND

Cryptography is used to keep a user's private data secure from unauthorized viewers by, for example, encrypting the user's data intended to be kept private, known as plaintext, into ciphertext that is incomprehensible to unauthorized viewers. The encoded ciphertext, which appears as gibberish, may then be securely stored and/or transmitted. Subsequently, when needed, the user or an authorized viewer may have the ciphertext decrypted back into plaintext. This encryption and decryption process allows a user to create and access private data in plaintext form while preventing unauthorized access to the private data when stored and/or transmitted in ciphertext form.

Encryption and decryption are conventionally performed by processing an input (plaintext or ciphertext, respectively) using a cryptographic key to generate a corresponding output (ciphertext or plaintext, respectively). A cryptographic system that uses the same key for both encryption and decryption is categorized as a symmetric cryptographic system. One popular symmetric cryptographic system is the Advanced Encryption Standard (AES), which is described in Federal Information Standards (FIPS) Publication 197.

Computing devices, and particularly virtualized computing devices (e.g., virtualized server environments), may allow a single physical computing platform to be shared by one or more entities, such as an application, process or virtual machine (VM), also referred to as "realms." In a server class system, the total number of realms an exceed ten thousand.

Note that a single physical server, which may comprise multiple processor cores on multiple IC devices, is operated as a single platform. The physical platform supports a hypervisor program, which manages the operation of multiple realms on the physical platform. A particular realm managed by the hypervisor may be actively running on the physical platform or may be stored in a memory in a suspended state. An active realm may access multiple different memory types and/or locations, some of which may be accessible to other realms running on the platform (such as, for example, the hypervisor itself). A realm may also access the memory contents of another realm, or the memory contents of the hypervisor, provided that access control permits such accesses. To protect the confidentiality of each realm against physical attacks such as DRAM probing/snooping, a portion—up to the entirety—of the realm's contents may be encrypted. For effective security, each realm should use one or more unique (i.e., exclusive) cryptographic key(s). Systems and methods to manage keys for encryption and/or decryption of VM code and data may be useful.

It would thus be desirable to provide a mechanism to manage encryption keys in a manner that conserves system resources (such as system bus bandwidth) while performing associated memory transactions and limiting physical chip area.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In one aspect, an apparatus comprises a realm management unit having a key ID association table indexed by a realm ID. The key ID association table is configured to associate a realm key ID with the realm ID, and to provide the associated realm key ID when looked up with the realm ID. The apparatus may further comprise a memory ownership table indexed by a physical address. The memory ownership table may be configured to associate a realm ID with a physical address, and to provide the associated realm ID to the realm management unit when looked up with the physical address.

In another aspect, a method comprises accessing a memory ownership table with a physical address to determine a realm ID associated with the physical address. The method further comprises accessing a key ID association structure with the realm ID to determine a realm key ID associated with the realm ID. The method further comprises initiating a memory transaction based on the realm key ID. The method may further comprise caching the realm key ID in a translation lookaside buffer.

In yet another aspect, an apparatus comprises means for realm management comprising a means for storing key ID associations indexed by a realm ID. The means for storing key ID associations is configured to associate a realm key ID with the realm ID, and to provide the associated realm key ID when looked up with the realm ID.

In yet another aspect, a non-transitory computer-readable medium comprises instruction which, when executed by a processor, cause the processor to access a memory ownership table with a physical address to determine a realm ID associated with the physical address. The instructions further cause the processor to access a key ID association structure with the realm ID to determine a realm key ID associated with the realm ID. The instructions further cause the processor to initiate a memory transaction based on the realm key ID.

In yet another aspect, an apparatus, comprises a processor, a memory system organized into pages, each of at least some pages being associated with a realm ID and encrypted with one of a plurality of keys identified by a realm key ID, a realm management unit having a key ID association table configured to associate a realm ID with a realm key ID, and wherein a page in memory is accessed using a realm key ID associated with the realm ID associated with the page.

BRIEF DESCRIPTION OF THE DRAWINGS

The disclosed embodiments will hereinafter be described in conjunction with the appended drawings, provided to illustrate and not to limit the disclosed embodiments, wherein like designations denote like elements, and in which:

FIG. 4 is a schematic representation of an exemplary data packet in accordance with one embodiment of the computer system of FIG. 2.

FIG. 5 is a flowchart for a process in accordance with one embodiment.

DETAILED DESCRIPTION

Figure 1:
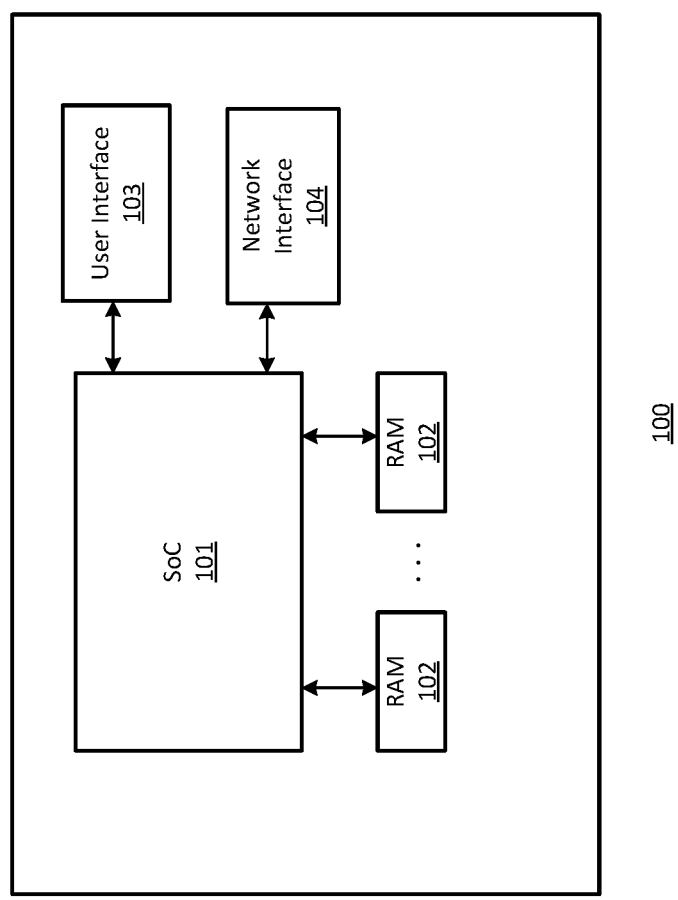
FIG. 1 is a simplified schematic diagram of a computer system in accordance with one embodiment.

Various embodiments are now described with reference to the drawings. In the following description, for purposes of explanation, specific details are set forth to provide a thorough understanding of one or more embodiments. It may be evident, however, that such embodiment(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples. Note that, for ease of reference and increased clarity, only one instance of multiple substantially identical elements may be individually labeled in the figures.

Embodiments of the present disclosure include systems wherein each VM runs within a corresponding protected software environment (PSE). The PSEs are managed by PSE management software. Note that cryptographic protection may be applied to any arbitrary software layer (e.g., firmware, hypervisor, VM/kernel, driver, application, process, sub-process, thread, etc.). Any such software may function inside of a PSE. The hypervisor would typically be the PSE management software for PSEs that encapsulate VMs, and the OS kernel would typically be the PSE management software for PSEs that encapsulate applications. In general, the PSE management software role would typically be fulfilled by the software running at the next-higher privilege level from the software contained within a PSE.

Embodiments of the present disclosure include systems and methods for the storage of a first plurality of cryptographic keys associated with a first plurality of corresponding PSEs (e.g. encapsulating virtual machines) supervised by PSE management software (e.g. a hypervisor) running on a computer system and configured to supervise a superset of the plurality of PSEs. The computer system stores currently unused keys of the superset in a relatively cheap, large, and slow memory (e.g., DDR SDRAM) in encrypted form and caches the keys of the first plurality in a relatively fast, small, and expensive memory (e.g., on-chip SRAM) in plaintext form. In one embodiment, in a computer system having a first processor, a first memory controller, and a first RAM, the first memory controller has a memory cryptography circuit connected between the first processor and the first RAM, the memory cryptography circuit has a keystore and a first cryptographic engine, and the keystore comprises a plurality of storage spaces configured to store a first plurality of cryptographic keys accessible by a key identifier (KID).

In some embodiments, a computer system comprising one or more processors and capable of parallel processing is configured to support the secure and simultaneous (that is, parallel) operation of a plurality of PSEs, wherein the plurality of PSEs has a corresponding plurality of cryptographic keys—in other words, each PSE is associated with a corresponding cryptographic key. In addition, the computer system has a random-access memory shared by the plurality of PSEs. The computer system has a memory cryptography circuit (MCC) connected between the one or more processors and the shared memory, where the MCC includes a cryptography engine and a keystore for storing a subset of the plurality of cryptographic keys. During data transmission operations between the processor and the shared memory (for example, in the fetching of processor instructions, data reads, and data writes), the cryptography engine encrypts or decrypts the transmitted data (for example, processor instructions) using a corresponding cryptographic key stored in the keystore. The implementation of the MCC in hardware or firmware and the caching of likely-to-be-used keys in the keystore helps to allow for the rapid and efficient execution of cryptographic operations on the transmitted data.

FIG. 1 is a simplified schematic diagram of a computer system 100 in accordance with one embodiment of the disclosure. Computer system 100 comprises a system on chip (SoC) 101 and one or more SoC-external random-access memory (RAM) modules 102, which may be, for example, double data rate (DDR) synchronous dynamic RAM (SDRAM) or any other suitable RAM. The computer system 100 also comprises user interface 103 and network interface 104. Note that, as would be appreciated by a person of ordinary skill in the art, the computer system 100, as well as any of its components, may further include any suitable assortment of various additional components (not shown) whose description is not needed to understand the embodiment.

Figure 2:
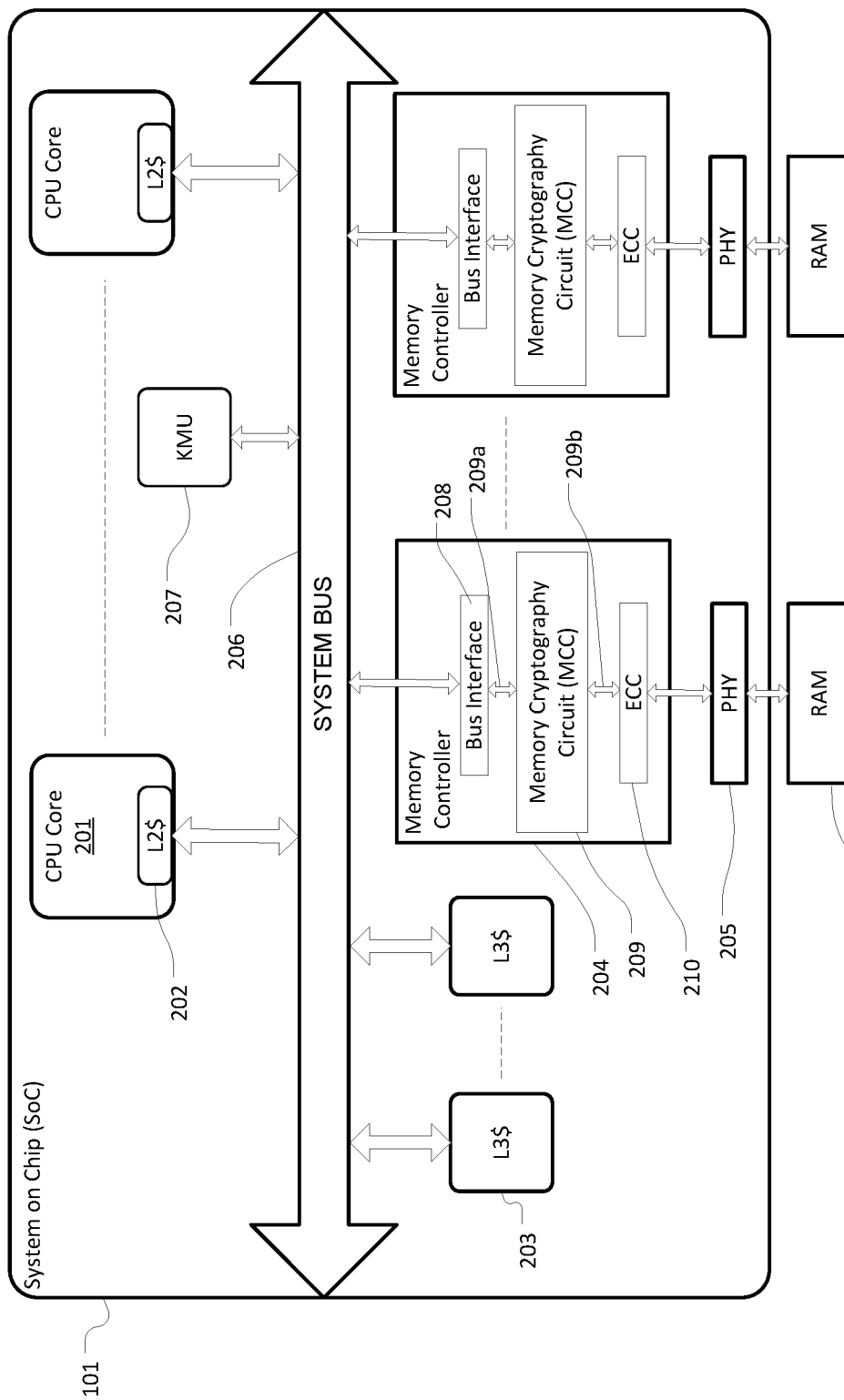
FIG. 2 is a simplified schematic diagram of a detailed portion of the computer system of FIG. 1.

FIG. 2 is a simplified schematic diagram of a detailed portion of the computer system 100 of FIG. 1. The SoC 101 comprises one or more central processing unit (CPU) cores 201, each of which may be a single-threaded or multi-threaded processor. Each CPU core 201 may include an L1 cache (not shown) and an L2 cache 202. The SoC 101 further comprises one or more L3 caches 203, one or more memory controllers 204, one or more physical layer (PHY) interfaces 205, and a system bus 206. The SoC 101 further comprises a key management unit (KMU) 207, which may be implemented as a discrete standalone module as shown, as a distributed module within two or more CPU cores 201, or in any suitable manner. The system bus 206 interconnects the CPU cores 201, L3 caches 203, KMU 207, and memory controllers 204, along with any other peripheral devices which may be included within the SoC 101.

The memory controller 204 comprises a bus interface 208 connected to the system bus 206. The bus interface 208 is also connected, via a data path 209a, to a memory cryptography (MC) circuit (MCC) 209 that is, in turn, connected to an optional error-correction-code (ECC) circuit 210 via a data path 209b. Note that in alternative embodiments, the MCC 209 may connect to the PHY 205 without an intermediary ECC circuit. The memory controller 204 is communicatively coupled to a corresponding PHY interface 205, which is, in turn, communicatively coupled to a corresponding external RAM module 102.

The computer system 100 supports the management, by PSE management software, of a plurality of PSEs, where a subset of the plurality of PSEs may run simultaneously as parallel processes. The computer system 100 supports parallel processing by multiple CPU cores 201. In some implementations, one or more of the CPU cores 201 may be configured to execute multiple threads in parallel. Note that in some alternative embodiments, the computer system 100 may have only one CPU core 201, which, however, supports multi-threaded processing and, consequently, parallel processing. Further note that in some alternative embodiments, the computer system 100 may comprise two or more SoCs coherently connected through chip-to-chip interfaces to form a multi-socket system.

The computer system 100 may support an arbitrarily large number of PSEs, each associated with a unique cryptographic key, which allows for the secure sharing of RAM modules 102 by the CPU cores 201 and allows the PSEs to operate securely from snooping by other processes such as, for example, other PSEs, the PSE management software, and attackers with physical access to the computer system 100 (e.g., physical attackers). The SoC 101 may be designed to use time-slicing to support an almost-simultaneous execution of a number of PSEs that is greater than the number of parallel processes supportable by the SoC 101 on the corresponding CPU cores 201, but lesser than the arbitrarily large total number of PSEs supportable by the computer system 100. As will be explained in greater detail below, the KMU 207 stores and manages the cryptographic keys and corresponding KIDs for the PSEs supported by the computer system 100.

As will be explained in greater detail below, in operation, when a first PSE running on a first CPU core 201 needs to write a data block to a RAM 102, the data block is encrypted by the MC circuit 209 using a first cryptographic key uniquely corresponding to the first PSE. The corresponding encrypted data block is then written to a first RAM module 102. When the first PSE needs to read a data block from RAM module 102, the data block, which is encrypted on the RAM module 102, is decrypted by the MC circuit 209 using the first cryptographic key and the corresponding decrypted data block is then transmitted to the CPU core 201 on which the first PSE is running. Note that writing to and reading from RAM modules 102 may be performed as part of routine instruction execution by CPU cores 201.

Figure 3:
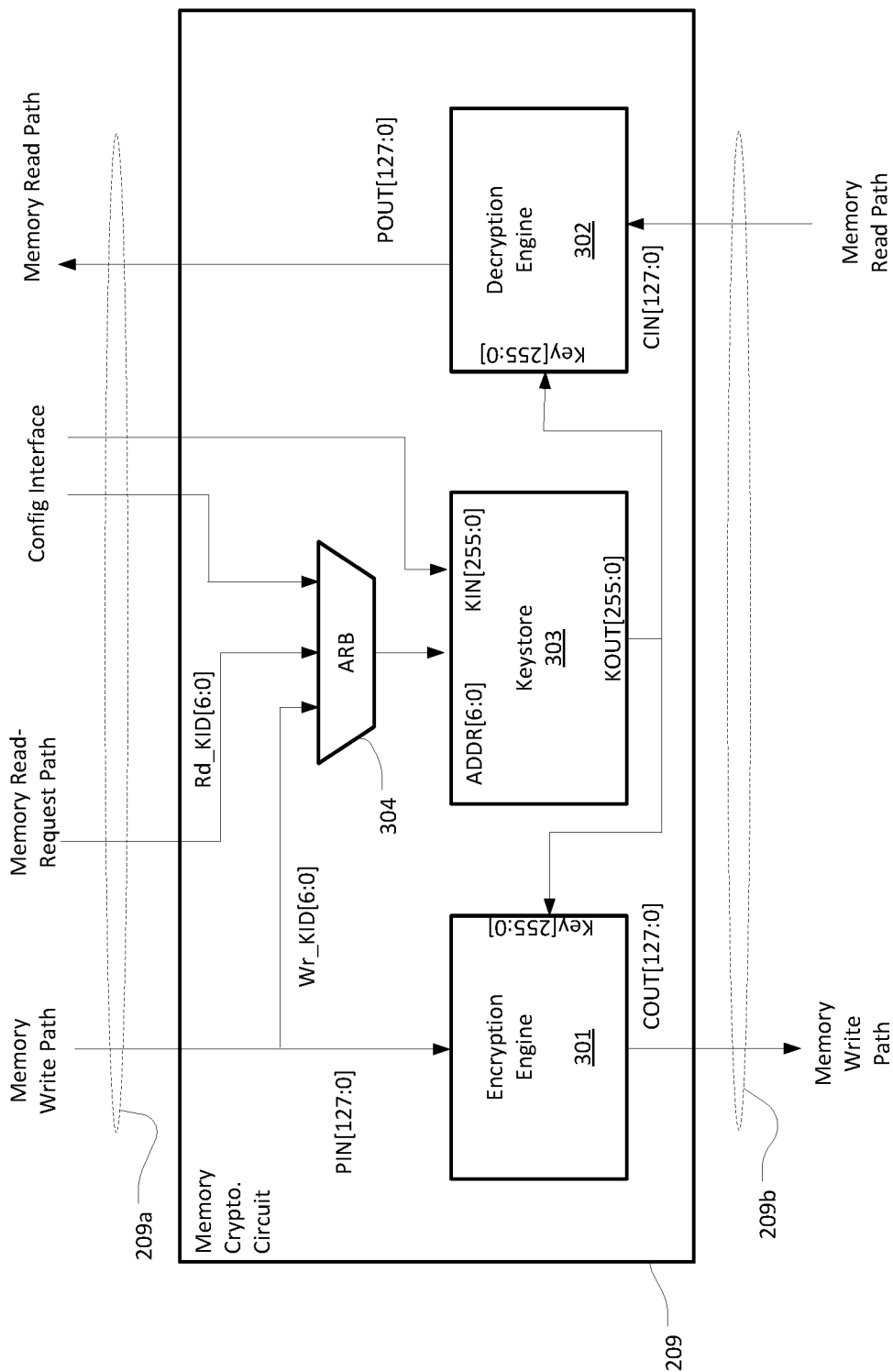
FIG. 3 is a simplified schematic diagram of the memory cryptography circuit of FIG. 2.

FIG. 3 is a simplified schematic diagram of the memory cryptography circuit 209 of FIG. 2. MC circuit 209 comprises an encryption engine 301, a decryption engine 302, a keystore 303, and an arbiter 304. The encryption engine 301 and the decryption engine 302 are two different types of cryptographic engines. The encryption engine 301 is a circuit configured to receive a block of plaintext and a cryptographic key, encrypt the plaintext with the cryptographic key using an encryption algorithm such as, for example, AES using an appropriate cipher mode of operation, and output a corresponding block of ciphertext. The decryption engine 302 is a circuit configured to receive a block of ciphertext and a cryptographic key, decrypt the ciphertext with the cryptographic key using a decryption algorithm such as, for example, AES using an appropriate cipher mode of operation, and output a corresponding block of plaintext. The keystore 303 may be a SRAM, register file, or similarly fast-access RAM configured to addressably store and update a plurality of cryptographic keys.

The keystore 303 is configured to receive a KID from the arbiter 304. In response to receiving a KID, the keystore 303 is configured to output the cryptographic key stored at the keystore address indicated by the KID. The output of the keystore 303 is connected to the cryptographic engines 301 and 302. The keystore 303 is also configured to receive, for storage, cryptographic keys from the Key Management Unit (KMU) 207 via the configuration interface. The KMU 207, via the configuration interface, provides, for example, a 256-bit cryptographic key and, via the arbiter 304, a corresponding KID. In response, the keystore 303 stores the received cryptographic key at the keystore address indicated by the KID.

The arbiter 304 is configured to receive a KID (i) from the CPU core 201 via the path 209a, and (ii) from the KMU 207 via the path 209a. Note that for both read and write requests, the KID is received from the CPU core 201. The KID is carried on the system bus 206 and may also be stored in the caches, where each cache lines carries the KID along with a memory address and data. Write requests from the CPU core 201 include plaintext data and the KID corresponding to the PSE running on the CPU core 201. Read requests from the CPU core 201 include a memory address and the PSE-corresponding KID. In response to the read request, the KID, or the corresponding key from the keystore 303, may be buffered by the MC circuit 209 until the ciphertext block located at the requested memory address is retrieved from the RAM 102, at which point, if the KID is buffered, then the KID is used to retrieve the corresponding key from the keystore 303. The ciphertext block and the key are then provided to the decryption engine 302.

The arbiter 304 multiplexes its KID inputs into one KID output provided to a KID input of the keystore 303. These arbiter 304 inputs may be referred to as, (i) memory write path, (ii) memory read-request path, and (iii) configuration interface path. The arbiter 304 may be configured to arbitrate among colliding KID inputs that are substantially simultaneously received based on, for example, assigned priority. In one implementation, KIDs associated with reads retrieved from the RAM module 102 are given the highest priority, KIDs associated with writes received from the CPU core 201 are given medium priority, and key updates received from the KMU are given the lowest priority. Note that alternative embodiments of the MC circuit 209 may forgo the arbiter 304 and, instead, have the KIDs provided directly to the keystore 303 and may have any suitable alternative mechanism for handling conflicting KID inputs to the keystore 303.

Note that each of the encryption engine 301 and the decryption engine 302 may be generically referred to as a cryptography engine. Note that, in some alternative embodiments, a single cryptography engine performs both encryption and decryption and additional circuitry provides the needed routing of data, address, and/or KID. Note that, in some alternative embodiments, the MC circuit 209 may have only one type of cryptography engine. In other words, in some alternative embodiments, the MC circuit 209 may have only an encryption engine and no decryption engine, or vice-versa.

In one implementation, the SoC 101 comprises sixteen single-threaded CPU cores 201, thereby allowing sixteen unique PSEs to run simultaneously. The PSE management software may be a program running distributed across one, some, or all of the CPU cores 201. The SoC 101 is configured to support thousands of PSEs and support time-slicing up to 128 PSEs at any one time. In other words, during normal operation, thousands of PSEs are suspended (in other words, are dormant), where a PSE's code and data exist in RAM encrypted with that PSE's key, but the PSE's corresponding cryptographic key is stored by the KMU in a relatively cheap, large, and slow memory (e.g., DDR SDRAM) in encrypted form, and therefore not immediately available for encrypting/decrypting that PSE's code and data. Meanwhile, scores of PSEs may be executing by time-slice sharing the sixteen CPU cores 201 of the SoC 101, where these PSEs' cryptographic keys are stored in the keystore 303 (a relatively fast, small, and expensive memory, e.g., on-chip SRAM) for rapid access by the cryptographic engines 301 and 302, where these PSEs' code and data may be stored in the RAM modules 102, and where up to sixteen of these PSEs may be executing simultaneously on the CPU cores 201.

Accordingly, the keystore 303 may be configured to cache 128 cryptographic keys. Each cryptographic key is stored in a corresponding 7-bit addressable (using the KID) memory location in the keystore 303. Note that a 7-bit address is usable to uniquely address 128 cryptographic-key locations (as $2^7$ equals 128). In one implementation, each cryptographic key is 256 bits.

FIG. 4 is a schematic representation of an exemplary data packet 400 in accordance with one embodiment of the computer system 100 of FIG. 2. The data packet 400 includes a data payload 403, a key identifier (KID) 402, and a header 401. In one implementation, (i) the data payload field 403 is at least 128 bits so as to be able to contain an entire 128-bit standard AES block, and (ii) the KID field is at least 7 bits to support addressing 128 cryptographic-key locations in the keystore 303. The header 401 may contain any suitable header information, such as, for example, attribute information for transmission of the data packet 400 on the system bus 206 (e.g., memory address, read/write indicator, source address for routing response, etc.). Note that a read-request packet may include only a KID and a header, including a memory address, with no payload. Relatedly, a read-response packet may include only a data payload and a header with no KID. Note further that the KID, when used, does not have to be an exclusive-use segment of the data packet and may be, for example, part of the header and/or used for purposes other than identifying a key location in the keystore.

FIG. 5 is a flowchart for a process 500 in accordance with one embodiment. The process 500 starts when a determination is made by a writing module that a data block needs to be written to a RAM module 102 (step 501). The writing module may be made by, for example, a first PSE executing on a first CPU that needs to directly write a block to memory or a first cache that needs to evict a cache line. Note that, in general, write requests from a PSE executing on a CPU may be cached and, while in the cache hierarchy of SoC 101, the data block is associated with the KID of the PSE. The writing module provides to the MC circuit 209, via the system bus 206 and bus interface 208, a corresponding data packet 400, which comprises the plaintext data block in the data payload 403 and the KID corresponding to the first PSE in the KID field 402 (step 502). Note that the data payload 403 may include suffix and/or prefix padding bits together with the data block. The data payload 403 is provided to the encryption engine 301 and the KID is provided to the arbiter 304, which provides the KID to the keystore 303 (step 503).

The keystore 303 outputs the cryptographic key stored at the address specified by the KID and provides that key to the encryption engine 301 (step 504). The encryption engine 301 executes an encryption algorithm (e.g., AES encryption) on the received plaintext data using the received key and outputs a corresponding ciphertext data block (step 505). The ciphertext data block is then provided to the RAM module 102 (step 506).

Figure 6:
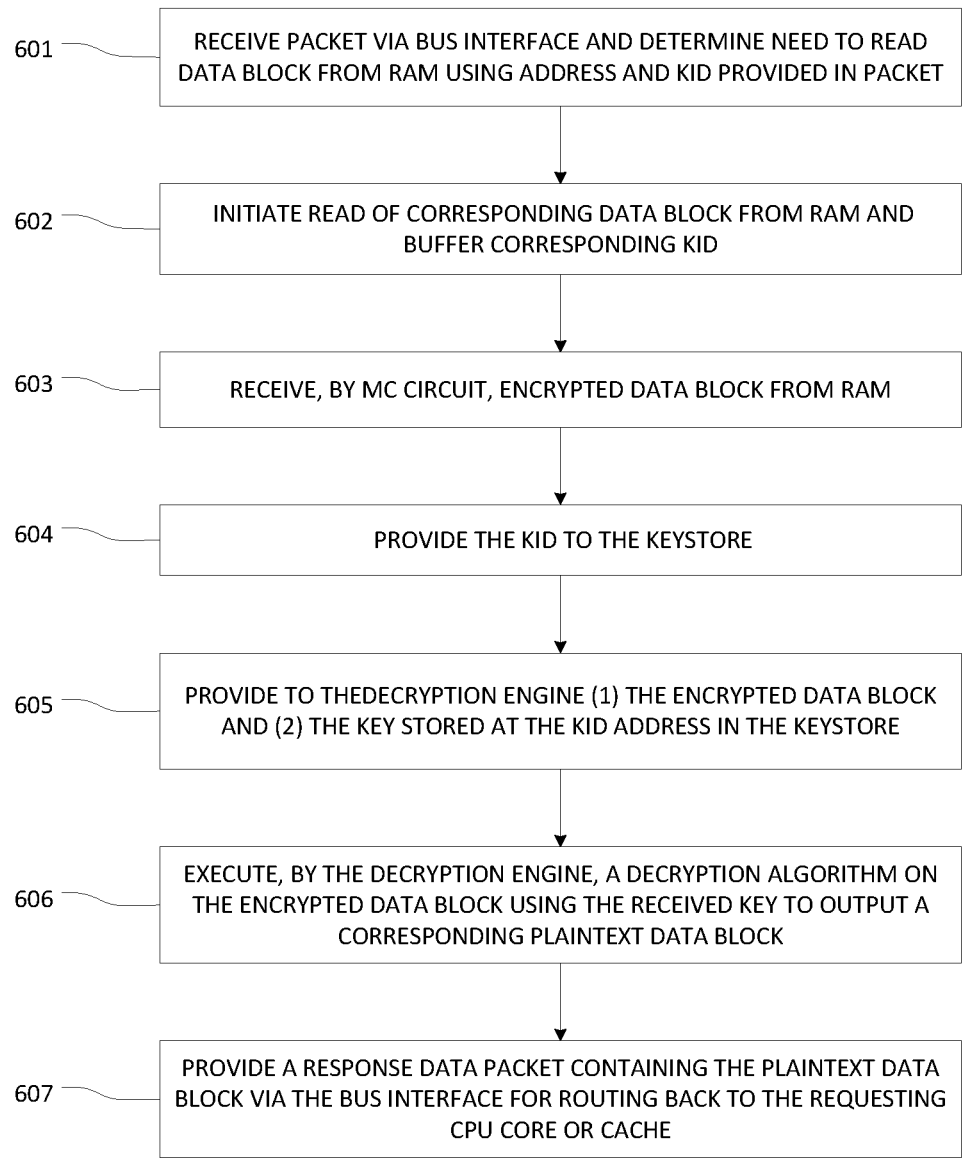
FIG. 6 is a flowchart of a process in accordance with one embodiment.

FIG. 6 is a flowchart of a process 600 in accordance with one embodiment. The process 600 starts when the memory controller 204 receives a data packet via the bus interface 208 and determines that a data block needs to be read (i.e., retrieved) from the RAM module 102 using the address and KID provided in the data packet(step 601). The data packet may be received from, for example, a CPU core 201, L2 cache 202, or L3 cache 203. The memory controller 204 initiates a read of the corresponding data block from the RAM module 102 and buffers the corresponding KID (step 602). The MC circuit 209 receives the requested encrypted data block from the RAM module 102 (step 603).

The KID is provided to the keystore 303 (step 604). The decryption engine 302 is provided (1) the retrieved encrypted data block and (2) the key stored at the KID address in the keystore 303 (step 605). The decryption engine 302 executes a decryption algorithm (e.g., AES decryption) on the received encrypted data block using the received key and outputs a corresponding plaintext data block (step 606). The memory controller 204 provides a response data packet containing the plaintext data block via the bus interface 208 for routing back to the requesting CPU core or cache (step 607).

Generic terms may be used to describe the steps of the above-described read and write processes 500 and 600. Determining needs to write or read data is determining a need to transfer data between the first PSE and a RAM module 102. Ciphertext and plaintext are data. Encryption and decryption are cryptographic operations, which take a first data block and output a first cryptographically corresponding data block.

Figure 7:
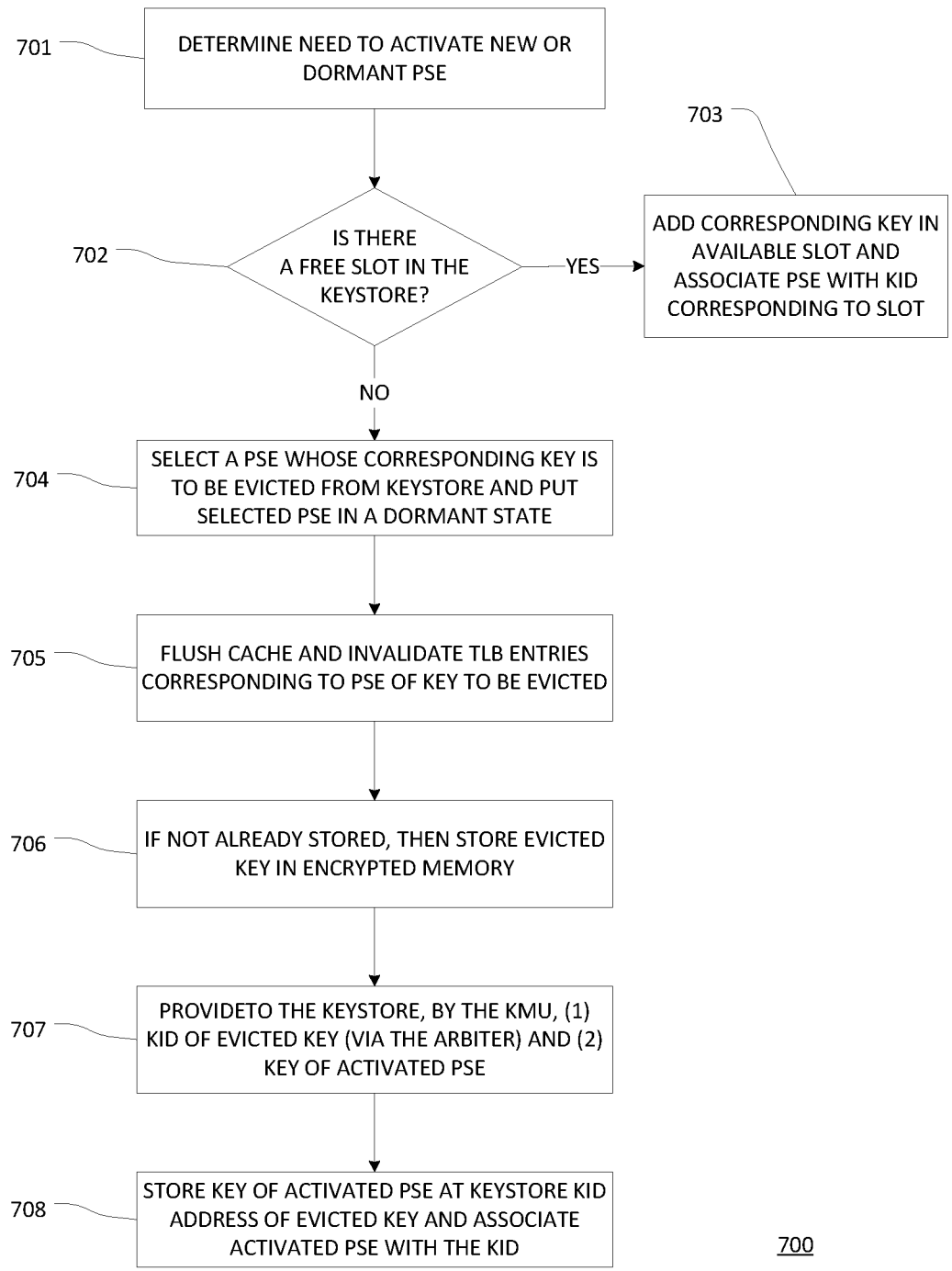
FIG. 7 is a flowchart of a process in accordance with one embodiment.

FIG. 7 is a flowchart of a process 700 in accordance with one embodiment. The process 700 starts when the PSE management software determines that a new or dormant PSE needs to be activated (step 701). In response to the determination, the PSE management software notifies the KMU 207, which determines if there is a free (e.g., empty) slot available in the keystore 303 (step 702). If there is, then the cryptographic key for the activating PSE is stored in the available slot in the keystore 303 and that activating PSE is associated with the KID corresponding to the keystore address of the available slot (step 703). If in step 702 it was determined that there is no free slot available in the keystore 303, then the KMU 207 selects a PSE whose corresponding key is to be evicted from the keystore 303 and puts the selected PSE in a dormant state (step 704). Any suitable algorithm—or combination of algorithms—may be used to determine which PSE to evict—for example, least used KID, randomly selected KID, sequentially selected KID, or lowest-priority-PSE KID.

Following the selection of the eviction PSE, the cache lines associated with the PSE of the key to be evicted are flushed and the translation lookaside buffer (TLB) entries associated with the PSE of the key to be evicted are invalidated (step 705). If not already stored, then the eviction PSE's corresponding cryptographic key is stored for possible later use, in a relatively cheaper, larger, and slower memory (e.g., DDR SDRAM) in encrypted form (step 706). The KMU 207 provides to the keystore 303 (1) via the arbiter 304, the KID of the evicted key and (2) the cryptographic key of the activation PSE (step 707) and the keystore 303 stores the cryptographic key of the activation PSE in the memory address indicated by the KID of the evicted key (step 708), thereby replacing the key of the eviction PSE with the key of the activation PSE in the keystore 303.

It should be noted that the above-described memory cryptography circuit may be used in systems other than computer system 100. For example, MC circuit 209 may be used in the management of encryption of so-called data at rest stored on shared non-volatile memory (e.g., on one or more non-volatile dual in-line memory modules NVDIMMs) by a plurality of filesystem, where each filesystem has a corresponding cryptographic key, similar to the above-described PSEs. In general, the memory cryptography circuit may be used in any suitable system where a relatively large plurality of clients and corresponding cryptographic keys are managed.

Figure 8:
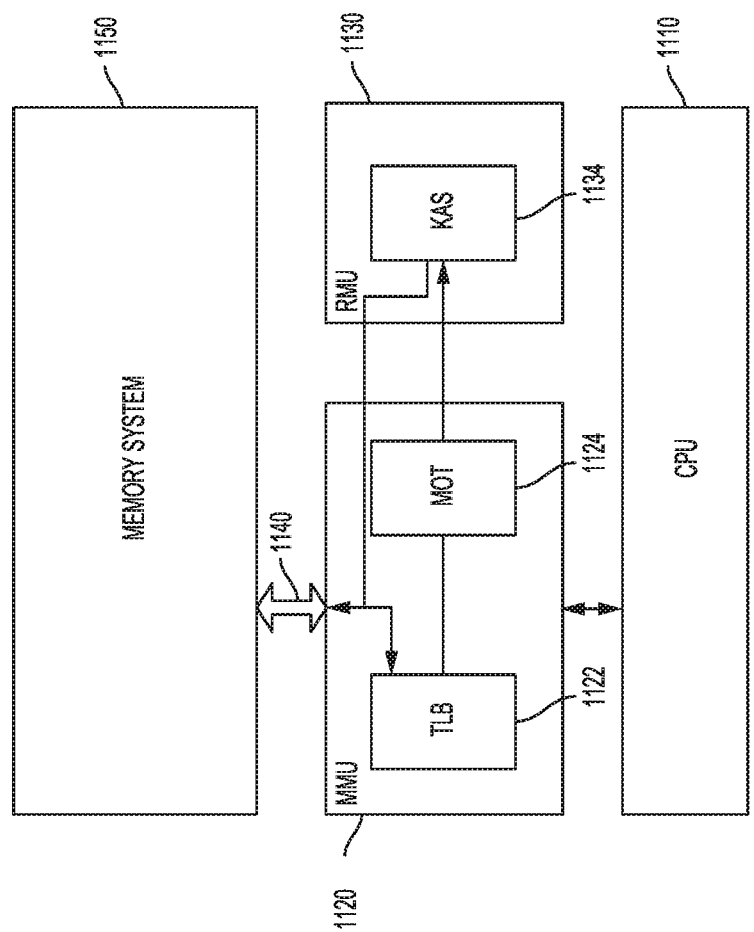
FIG. 8 shows a block diagram of a computing device configured to allow for fast storage and retrieval of realm key IDs according to certain aspects of the present disclosure.

FIG. 8 shows a block diagram of a computing device 1100 in accordance with another aspect of the present invention. Systems (which may be implemented on SoCs) may provide the ability to protect software running in "Realms" (e.g. a virtual machine, file system or application process) from higher privileged software (e.g. the hypervisor). These systems additionally provide protection against physical attacks (e.g. DRAM snooping), which requires the memory to be encrypted. To prevent certain classes of attacks, each Realm running on the system may utilize its own unique memory encryption key. There could be thousands of unique Realms running at any given time, so a high-performance method for using the correct key is necessary.

A CPU could tag all memory transactions with an ID of the key associated with the Realm currently running on the CPU—termed the Realm Key ID (RKID). The appropriate RKID could be programmed into a system register when loading or switching to the Realm. With this scheme, it would be difficult for one Realm to access memory pages belonging to another Realm—which may be undesirable. Further, the width of the RKID dictates by the max number of keys that will be stored and utilized. For example, if the RKID is 7 bits, the maximum number of keys is 128. Given the structure of modern systems, it is probably that there may be more realms then there are RKIDs.

Another method for the use of RKIDs would be to assign each memory page in the system a Realm ID of the Realm that owns the page. The memory system could perform a lookup using the page identifier/address to determine the RKID assigned to that Realm and tag any transaction with the appropriate RKID. In this way, the Realm ID namespace could be very large, much larger than the number of RKIDs. For example, Realm IDs may be 32 bits long (for a total of 4,294,967,296 possible Realms), while RKIDs may be only 12 bits long (for a total of 4,096 RKIDs). This method would also facilitate one Realm accessing the memory pages of another Realm. The present aspect is suitable for the fast lookup of a RKID using a Realm ID and/or a filesystem ID (referred to herein as the Realm ID for simplicity).

The computing device 1100 illustrated in FIG. 8 is configured to allow for fast storage and retrieval of RKIDs according to certain aspects of the present disclosure. Preferably, RKIDs are identifiers that consume a relatively smaller number of bits and may be dynamically associated with a specific realm ID.

The computing device 1100 comprises a CPU 1110 coupled to a memory management unit 1120. The memory management unit 1120 is further coupled to a realm management unit 1130 (similar in function to the KMU 207), and to a memory system 1150 (e.g. a cache or main memory) via a system bus 1140. The memory management unit (MMU) 1120 includes a translation lookaside buffer (TLB) 1122 and an associated memory ownership table 1124. The memory ownership table 1124 is configured to associate a physical memory page with a realm ID. The realm management unit 1130 includes a key ID association structure 1134, and is responsible for managing allocation, deletion, and replacement of mappings in the key ID association structure 1134. The key ID association structure 1134 is configured to associate a realm ID with a realm key ID.

When the CPU 1110 wants to perform a memory access to a memory page, it sends a request for access to the memory page to the MMU 1120. The MMU 1120 will then access the TLB 1122 to determine the physical address of the memory page. Once the MMU 1120 has determined the physical address, it will access the memory ownership table 1124 to determine a realm ID of the realm that owns the page of memory associated with that physical address.

The realm ID is the provided to the realm management unit 1130, which performs a lookup in the key ID association structure 1134 to determine a realm key ID that is associated with the provided realm ID. Once the appropriate realm key ID is known, the memory access from CPU 1110 can be launched onto the system bus 1140 with the associated realm key ID (RKID) to access the memory system 1150. Further, once the RKID has been retrieved from the key ID association structure 1134, in some aspects it may thereafter be cached in the TLB 1122 in association with the block or page of memory being accessed (i.e., with the associated virtual address). This can avoid further lookups in the memory ownership table 1124 and the key ID association structure 1134 when access to that block or page of memory is requested. If the realm key ID is cached in the TLB 1122, the TLB 1122 may further implement a "TLB invalidate by RKID" function to invalidate any TLB entries associated with a particular RKID to handle the case where an RKID is deallocated from association with one realm and is allocated to another realm. Alternatively, the RKID retrieved from the key ID association structure 1134 may be cached in a separate key association cache (not illustrated) which would be accessed in parallel with the TLB 1122 and would implement an analogous "invalidate by RKID" function.

Figure 9:
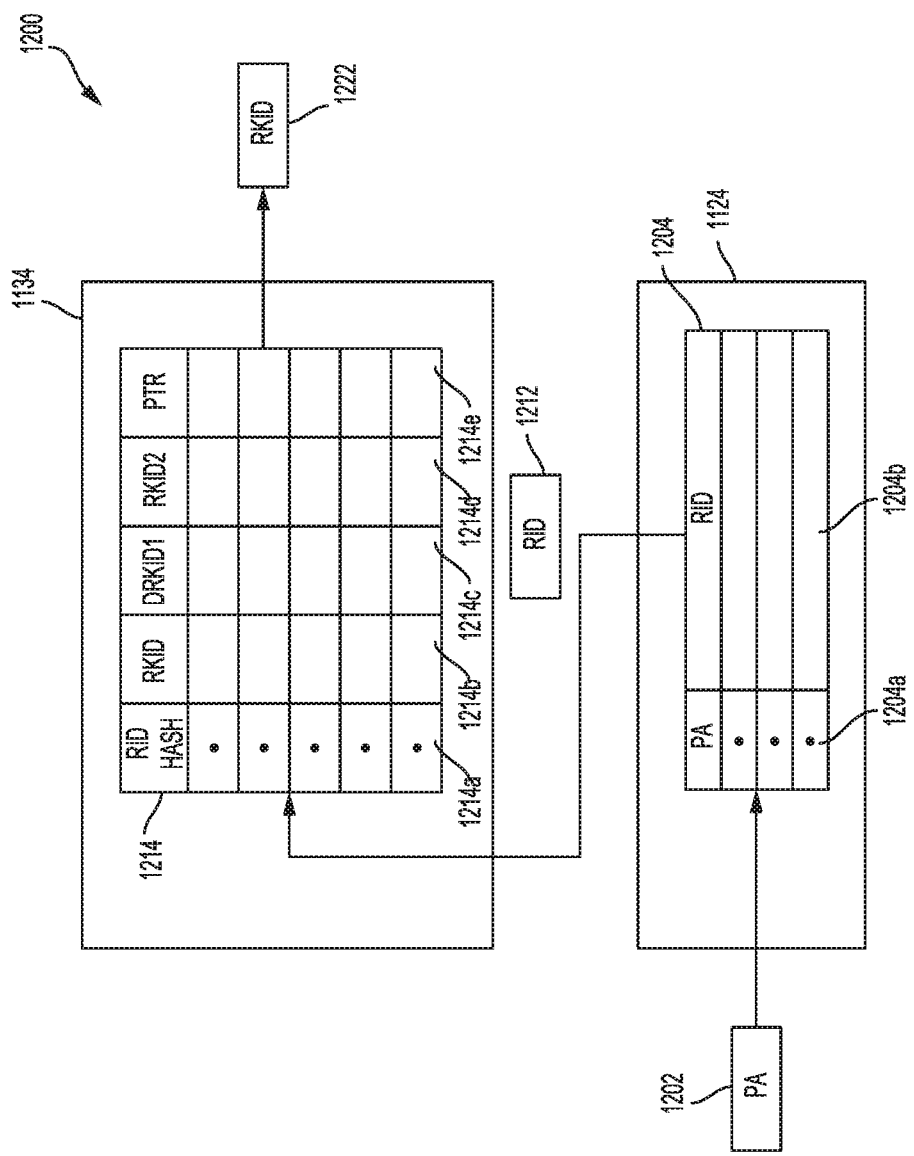
FIG. 9 shows a detailed block diagram of a memory ownership table and a key ID association structure of the computing device according to certain aspects of the present disclosure.

FIG. 9 shows a detailed block diagram 1200 of the memory ownership table 1124 and the key ID association structure 1134 of the computing device according to certain aspects of the present disclosure. The memory ownership table 1124 comprises a look-up table 1204 with a first column 1204*a* including a physical address and a second column 1204*b* including a realm ID associated with the physical address. Although the look-up table 1204 is illustrated as having four entries (rows), those having skill in the art will recognize that the number of entries is a design choice, and differing numbers of entries for the look-up table 1204 may be chosen in other aspects.

The key ID association structure 1134 contains a look-up table 1214 having a first column 1214*a* including a realm ID, a second column 1214*b* including a first realm key ID, a third column 1214*c* including a second realm key ID, a fourth column 1214*d* including a third realm key ID, and a fifth column 1214*e* including a pointer to another table entry. Although the look-up table 1214 has been illustrated as including six entries (rows), each having three realm key IDs and a pointer to another table entry, those having skill in the art will again recognize that the number of entries, number of realm key IDs, and use of a pointer are all design choices. Where the look-up table 1214 is implemented as a hash table, the use of a pointer may be advantageous to allow to look-up table 1214 to handle collisions (i.e., more realm key IDs mapped to a single realm ID than there are columns to store realm key IDs) by setting the pointer to point to another entry in the look-up table 1214 when an attempt is made to add another realm key ID to an entry that already contains the maximum number. In some aspects, the look-up table 1214 may employ cuckoo hashing (i.e., having two active hash functions that may be used to insert or retrieve entries from the table) to further reduce collisions. Again, those having skill in the art will recognize that other aspects may implement the look-up table 1214 as a data structure other than a hash table, which may solve the problem of collisions differently.

In operation, a physical address 1202 is received by the memory ownership table 1124 from the TLB 1122. The memory ownership table 1124 then looks up the physical address 1202 in the look-up table 1204. If the physical address 1202 is present, an associated realm ID 1212 is identified. The associated realm ID 1212 is then provided to the key ID association structure 1134, which looks up the realm ID 1212 in the look-up table 1214. If the realm ID 1212 is present in the look-up table 1214, an associated realm key ID 1222 is identified, and then provided back to the MMU 1120 (and the TLB 1122). The MMU 1120 then initiates the memory access on the system bus 1140 with the associated realm key ID 1222.

If the realm ID 1212 is not present in the look-up table 1214 (i.e., that realm ID does not have an associated realm key ID), a miss occurs. This happens, for example, when a realm attempts to gain access to a memory page owned by another realm, access controls permit the access, and the other realm isn't currently executing and has thus had its previous RKID reassigned. When this occurs, if there are unassigned RKIDs, the RMU 1130 assigns one of the unassigned RKIDs to the realm ID that caused the miss (in this case, realm ID 1212). If there are no unassigned RKIDs, the RMU 1130 will choose a "victim" RKID (which may be done by selecting a least recently used RKID, or by other replacement algorithms known to those having skill in the art), delete that RKID's current assignment to a realm ID (including updating any and all associated data structures), and assign the victim RKID to the realm ID that caused the miss (again, in this case, realm ID 1212). Once the realm ID 1212 has been associated with an RKID, the RMU 1130 signals to the MMU 120 to re-try the operation, which will now succeed.

Figure 10:
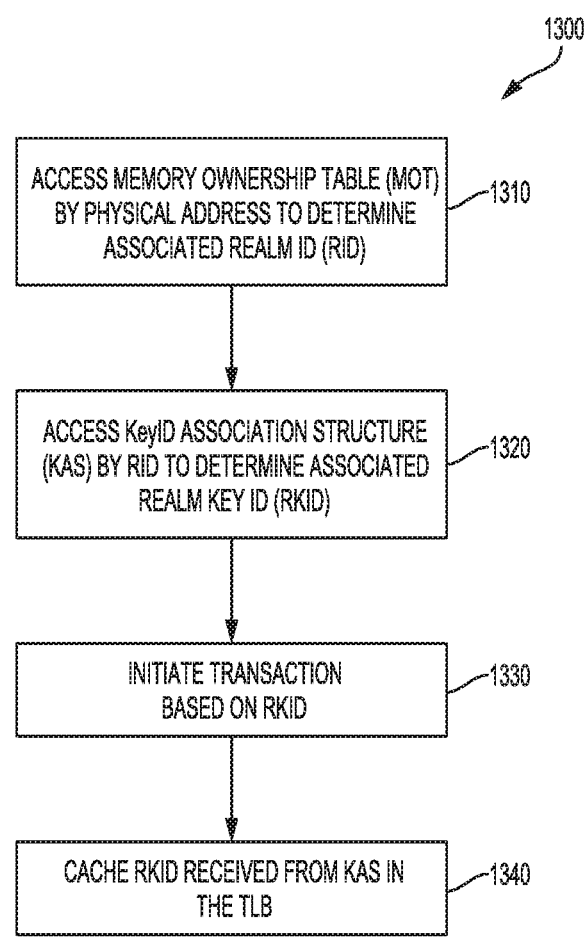
FIG. 10 shows a method of retrieving a realm key ID according to certain aspects of the present disclosure.

FIG. 10 shows a method 1300 of retrieving a realm key ID according to certain aspects of the present disclosure. The method 1300 begins in block 1310, where a memory ownership table is accessed with a physical address to determine a realm ID associated with that physical address. For example, the memory ownership table 1124 is accessed with the physical address 1202 to retrieve the associated realm ID 1212.

The method continues in block 1320, where a key ID association structure is accessed with the realm ID to determine a realm key ID associated with the realm ID. For example, the key ID association structure 1134 is accessed with the realm ID 1212 to retrieve the associated realm key ID 1222.

The method continues in block 1330, where a memory transaction is initiated based on the realm key ID. For examples, the MMU 1120 receives the realm key ID 1222 from the key ID association structure 1134 and initiates a memory transaction based on the realm key ID 1222.

The method continues in block 1340, where the received realm key ID is cached in a translation lookaside buffer. This allows future accesses to proceed more quickly, since the realm key ID can be retrieved directly from the TLB. For example, the realm key ID 1222 is cache by the MMU 1120 in the TLB 1122 along with the entry for the associated memory page. In an alternative aspect, the received realm key ID may be cached in a dedicated cache, as discussed with respect to FIG. 8.

Figure 11:
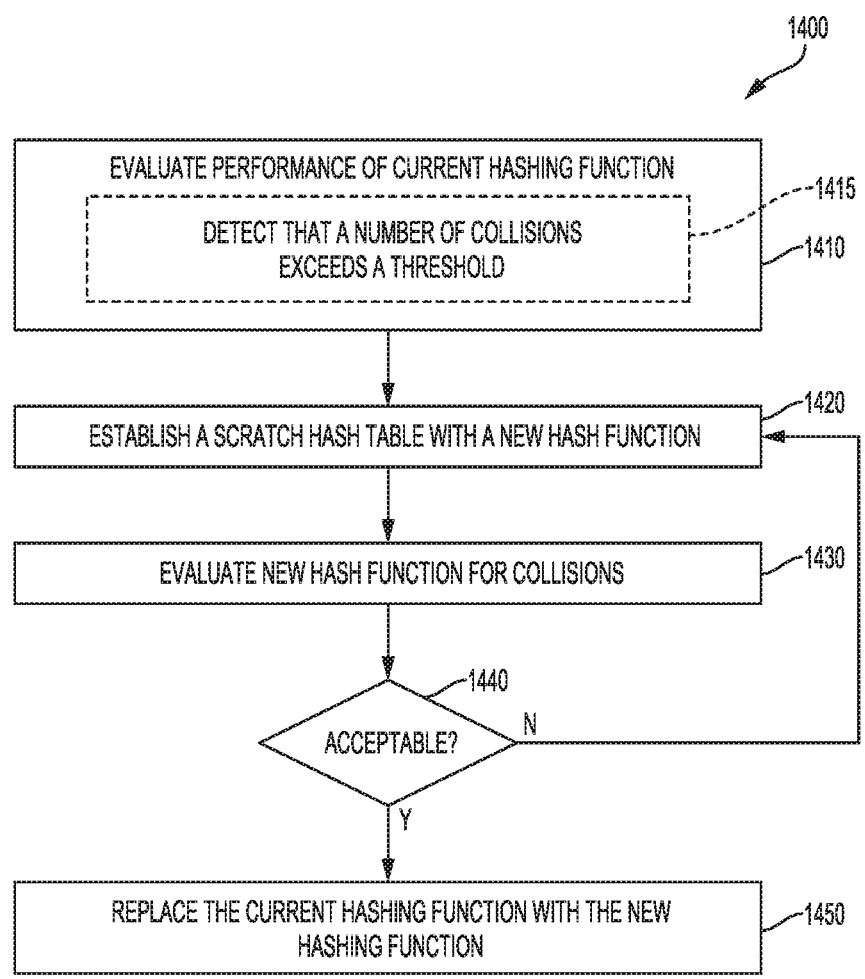
FIG. 11 shows a method of replacing a hashing function associated with storing realm key IDs according to certain aspects of the present disclosure.

FIG. 11 shows a method 400 of replacing a hashing function associated with storing realm key IDs according to certain aspects of the present disclosure. As discussed with reference to FIG. 9, the occurrence of collisions in the key ID association structure 1134 may degrade system performance because multiple entries of the key ID association structure 1134 may need to be traversed via pointers (e.g., as a linked list) to locate a desired realm key ID. It may thus be advantageous to replace the hashing function associated with the key ID association structure 1134. To this end, the method 1400 begins at block 1410, where the performance of a current hashing function is evaluated. This may further include, at block 1415, detecting that a number of collisions exceeds a threshold. The threshold may be programmable or otherwise dynamic in nature.

The method 1400 continues at block 1420, where a scratch hash table with a new hash function (e.g., a hash function using a different seed value) is established. In block 1430, the new hash function is evaluated for collisions. In block 1440, it is determined whether the performance of the new has function is acceptable. If the performance is not acceptable, the method returns to block 1420 and a different new hash function is established for the scratch hash table. The current hashing function may be retained during the operations of block 1420-1440 so that the computing device can continue to perform computations while new hashing functions are evaluated.

If the performance of the new hashing function is acceptable, the method continues to block 1450. In block 1450, the current hashing function is replaced with the new hashing function.

Figure 12:
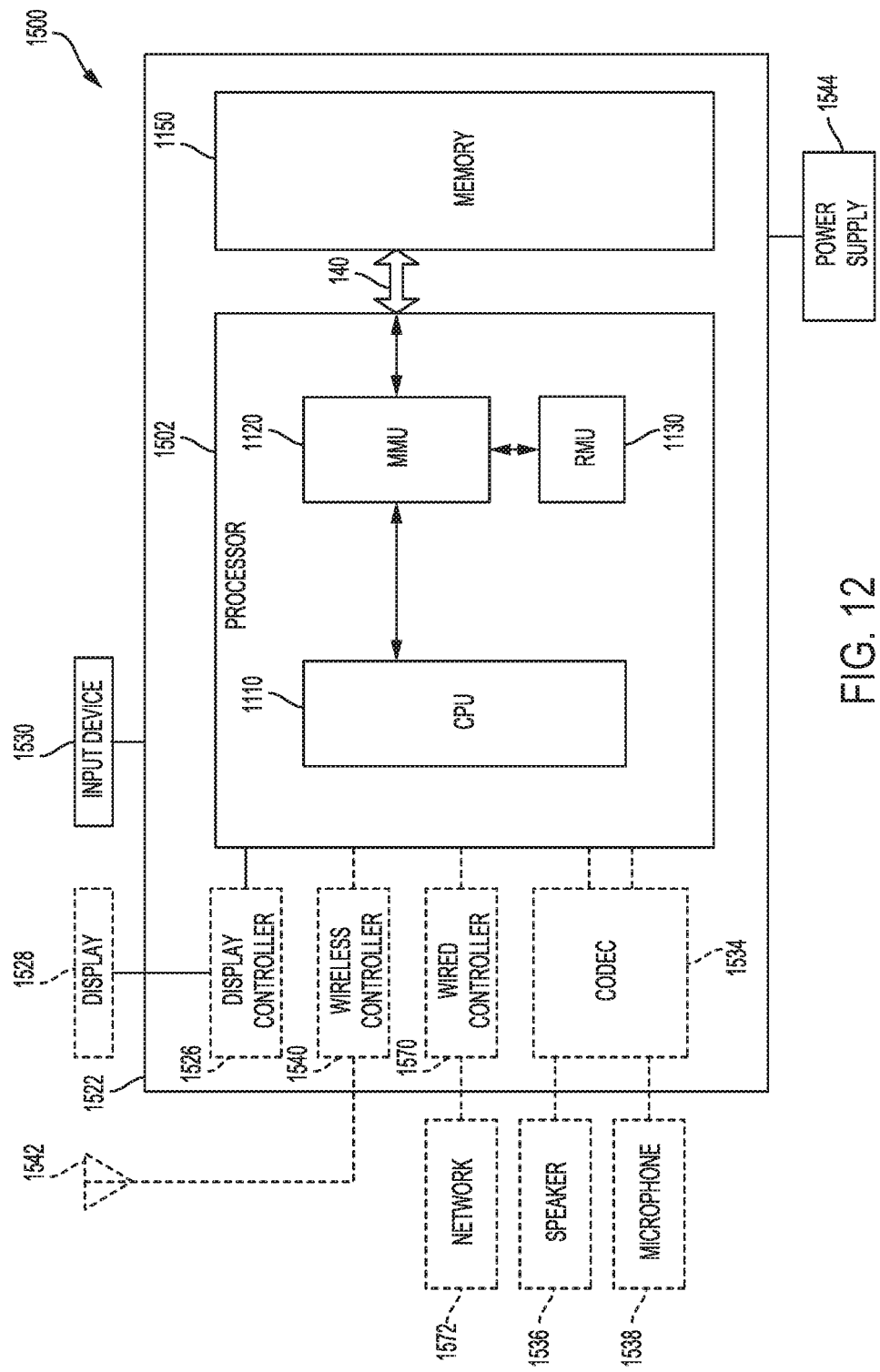
FIG. 12 shows a system-level diagram of a computing device configured to allow for fast storage and retrieval of realm key IDs according to certain aspects of the present disclosure.

FIG. 12 shows a diagram of a computing device 1500 incorporating a structure for storing realm key IDs as described with respect to FIG. 8 and FIG. 9, and which may be operable in accordance with the methods described in FIGS. 10 and 11. In that regard, the system 1500 includes the processor 1502 which may incorporate CPU 1110, MMU 1120, and RMU 1130 as described with regard to FIGS. 8 and 9. The system 1500 further includes the memory 1150 coupled to the processor 1502 via the system bus 1140. The memory 1150 may further store non-transitory computer-readable instructions that, when executed by the processor 1502, may perform the method 1300 of FIG. 10 or the method 1400 of FIG. 11.

FIG. 12 also shows optional blocks in dashed lines, such as coder/decoder (CODEC) 1534 (e.g., an audio and/or voice CODEC) coupled to processor 1502. An optional speaker 1536 and microphone 1538 can be coupled to CODEC 1534. An optional wireless antenna 1542 coupled to an optional wireless controller 540 which is, in turn, coupled to processor 1502. Further, the system 1502 also illustrates and optional display controller 1526 coupled to processor 1502 and to an optional display 1528. An optional wired network controller 1570 is illustrated as being coupled to processor 1502 and to an optional network 1572. Processor 1502, display controller 1526, memory 1150, and wireless controller 1540 may be included in a system-in-package or system-on-chip device 1522.

Accordingly, input device 1530 and power supply 1544 are coupled to the system-on-chip device 1522. Moreover, as illustrated in FIG. 12, where one or more optional blocks are present, display 1528, input device 1530, speaker 1536, microphone 1538, wireless antenna 1542, and power supply 1544 are external to the system-on-chip device 1522. However, each of display 1528, input device 1530, speaker 1536, microphone 1538, wireless antenna 1542, and power supply 1544 can be coupled to a component of the system-on-chip device 1522, such as an interface or a controller.

It should be noted that although FIG. 12 generally depicts a computing device, processor 1502 and memory 1150, may also be integrated into a mobile phone, a communications device, a computer, a server, a laptop, a tablet, a personal digital assistant, a music player, a video player, an entertainment unit, and a set top box, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any order. Furthermore, although elements of the invention may be described or claimed in the singular, the plural is contemplated unless limitation to the singular is explicitly stated.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described embodiments may be described or claimed in the singular, the plural is contemplated unless limitation to the singular is explicitly stated. Additionally, all or a portion of any embodiment may be utilized with all or a portion of any other embodiment, unless stated otherwise. Thus, the disclosure is not to be limited to the examples and designs described herein but is to be accorded the widest scope consistent with the principles and novel features disclosed herein.

What is claimed is:

1. An apparatus, comprising:
    a processor;
    a memory system accessible by the processor and organized into pages, each of at least some pages being associated with a realm ID and encrypted with one of a plurality of keys identified by a realm key ID;
    a realm management unit having a key ID association table configured to associate a realm ID with a realm key ID; and
    wherein:
        a page in memory is configured to be accessed using the realm key ID associated with the realm ID associated with the page; and
        the key ID association table is a hash table indexed by a first hash function.

2. The apparatus of claim 1, further comprising:
    a memory management unit comprising:
    a translation lookaside buffer configured to associate a page with a memory address; and
    a memory ownership table configured to associate a memory address with a realm ID.

3. The apparatus of claim 2, wherein the translation lookaside buffer is further configured to cache recently accessed realm key IDs.

4. The apparatus of claim 1, wherein each entry in the key ID association table comprises an indexed realm ID, at least one associated realm key ID, and a pointer to a next entry.

5. The apparatus of claim 1, wherein the key ID association table is further configured to be indexed by a second hashing function.

6. The apparatus of claim 1, further comprising a scratch key ID association table having a scratch hash function different from the current hash function, the scratch key ID association table established by the realm management unit in response to detecting that a number of collisions in an entry of the key ID association table has exceeded a threshold.

7. The apparatus of claim 6, wherein the threshold of the number of collisions is configurable.

8. The apparatus of claim 6, wherein the realm management unit is further configured to evaluate the scratch hash function for collisions; and
   - if the number of collisions is below a second threshold, replace the current hash function of the key ID association table with the scratch hash function; or
   - if the number of collisions is not below a second threshold, select another scratch hash function and repeat the evaluation.

9. The apparatus of claim 3, wherein the memory management unit is configured to initiate a memory transaction using the realm key ID received from the realm management unit.

10. An apparatus, comprising:

a processor;

means for storing data accessible by the processor, the means for storing data organized into pages, each of at least some pages being associated with a realm ID and encrypted with one of a plurality of keys identified by a realm key ID;

means for realm management comprising a means for storing realm key IDs indexed by a realm ID;

wherein:
   - the means for storing realm key IDs is configured to associate the realm key ID with the realm ID, and to provide the associated realm key ID in response to the realm ID, and
   - the means for storing realm key IDs comprises a hash table indexed by a first hash function.

\* \* \* \* \*